US012780191B2

(12) United States Patent
Gudapati et al.

(10) Patent No.: US 12,780,191 B2
(45) Date of Patent: Nov. 3, 2026

(54) VEHICLE ON-BOARD UNIT FOR CALCULATING TARGET VEHICLE SPEED

(71) Applicant: NISSAN NORTH AMERICA, INC., Franklin, TN (US)

(72) Inventors: Nitish Gudapati, Stanford, CA (US); Fang Chieh Chou, Sunnyvale, CA (US); Najamuddin Mirza Baig, San Jose, CA (US); Liam Pedersen, San Francisco, CA (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 174 days.

(21) Appl. No.: 17/978,056

(22) Filed: Oct. 31, 2022

(65) Prior Publication Data

US 2024/0157937 A1 May 16, 2024

(51) Int. Cl.
*B60W 30/14* (2006.01)
*G08G 1/052* (2006.01)

(52) U.S. Cl.
CPC ........... *B60W 30/143* (2013.01); *G08G 1/052* (2013.01); *B60W 2554/404* (2020.02); *B60W 2554/80* (2020.02)

(58) Field of Classification Search
CPC ......... B60W 30/143; B60W 2554/404; B60W 2554/80; G08G 1/052
See application file for complete search history.

(56) References Cited

U.S. PATENT DOCUMENTS

| | | | | |
|---|---|---|---|---|
| 8,655,543 | B2 | 2/2014 | Tengler et al. | |
| 8,831,813 | B1 * | 9/2014 | Ferguson | B60W 30/143 701/28 |
| 2006/0226968 | A1 * | 10/2006 | Tengler | G08G 1/096741 340/466 |
| 2012/0059574 | A1 * | 3/2012 | Hada | G08G 1/0112 701/119 |
| 2013/0116909 | A1 * | 5/2013 | Shida | G08G 1/16 701/96 |
| 2013/0268174 | A1 * | 10/2013 | Koshizen | G08G 1/166 701/96 |
| 2013/0297196 | A1 * | 11/2013 | Shida | B60W 30/143 701/119 |
| 2016/0159350 | A1 * | 6/2016 | Pilutti | B60W 30/143 701/23 |
| 2017/0197549 | A1 * | 7/2017 | Vladimerou | B60W 30/08 |
| 2018/0029639 | A1 * | 2/2018 | Taniguchi | B60R 16/0231 |
| 2018/0170388 | A1 * | 6/2018 | Shin | B60W 60/001 |

(Continued)

*Primary Examiner* — David P. Merlino
(74) *Attorney, Agent, or Firm* — Spencer Fane, LLP

(57) ABSTRACT

A vehicle on-board unit for a host vehicle comprises a communication system and an electronic controller. The communication system is programmed to electronically receive travel information from one or more preceding vehicles that are traveling ahead of the host vehicle in a lane. The electronic controller includes a vehicle path determination component programmed to determine a travel path of the host vehicle in the lane in which the host vehicle is currently traveling. The electronic controller further includes a target vehicle speed determination component programmed to determine a target vehicle speed for the host vehicle based on the travel information received from the one or more preceding vehicles. The travel information includes traveling speed of a predetermined group of preceding vehicles.

17 Claims, 6 Drawing Sheets

(56) References Cited

U.S. PATENT DOCUMENTS

| | | | | |
|---|---|---|---|---|
| 2018/0194352 | A1* | 7/2018 | Avedisov | G08G 1/163 |
| 2018/0265085 | A1* | 9/2018 | Mallinger | B60W 30/143 |
| 2020/0001878 | A1* | 1/2020 | Tashiro | B60W 10/04 |
| 2020/0255035 | A1* | 8/2020 | Sonntag | B60W 40/08 |
| 2020/0377091 | A1* | 12/2020 | Nanjo | B60W 30/18072 |
| 2021/0097148 | A1* | 4/2021 | Bagschik | G06F 30/15 |
| 2021/0316726 | A1* | 10/2021 | Kim | B60W 30/16 |
| 2022/0108610 | A1* | 4/2022 | Dhillon | G08G 1/056 |
| 2022/0172606 | A1* | 6/2022 | Pandya | G08G 1/052 |
| 2022/0203973 | A1* | 6/2022 | Dronen | G06V 20/58 |
| 2023/0083645 | A1* | 3/2023 | Zeiynali Farid | B60W 40/04<br>701/25 |

* cited by examiner

VEHICLE ON-BOARD UNIT FOR CALCULATING TARGET VEHICLE SPEED

BACKGROUND

Technical Field

The present disclosure generally relates to a vehicle on-board unit. More specifically, the present disclosure relates to a vehicle on-board unit provided for a vehicle that is connected to a communications network.

Background Information

Traffic congestion is a severe problem in road networks across the world. Congestion mitigation strategies can greatly assist in improving the sustainability of existing transportation systems. Cooperative adaptive cruise control can be used to mitigate unstable driving behaviors which trigger traffic congestion by coordinating driving behaviors of automated vehicles in a platoon. However, many communications network 14*s* assumes that all vehicles are equipped with wireless communication. For example, vehicle-to-everything (V2X) assumption in cooperative adaptive cruise control assumes all vehicles on the road are equipped with wireless communication. For congestion mitigation to be effective, these systems require high penetration rates to show a significant impact.

SUMMARY

In view of the state of the known technology, one aspect of the present disclosure is to provide a vehicle on-board unit for a host vehicle comprises a communication system and an electronic controller. The communication system is programmed to electronically receive travel information from one or more preceding vehicles that are traveling ahead of the host vehicle in a lane. The electronic controller includes a vehicle path, determination component programmed to determine a travel path of the host vehicle in the lane in which the host vehicle is currently traveling. The electronic controller further includes a target vehicle speed determination component programmed to determine a target vehicle speed for the host vehicle based on the travel information received from the one or more preceding vehicles. The travel information includes traveling speed of a predetermined group of preceding vehicles.

In view of the state of the known technology, another aspect of the present disclosure is to provide a host vehicle comprising a communication system and an electronic controller. The communication system is programmed to electronically receive travel information from one or more preceding vehicles. The electronic controller includes a vehicle path determination component programmed to determine a travel path of the host vehicle in a lane in which the host vehicle is currently traveling. The target vehicle speed determination component is programmed to determine a target vehicle speed for the host vehicle based on the travel information received from the one or more preceding vehicles. The travel information includes traveling speed of a predetermined group of preceding vehicles.

In view of the state of the known technology, another aspect of the present disclosure is to provide target vehicle speed determination method. The target vehicle speed determination method comprises determining a travel path of the host vehicle in a lane in which the host vehicle is currently traveling. The method further comprises receiving travel information from one or more preceding vehicles that are traveling ahead of the host vehicle in the lane. The method further comprises calculating an average speed of a predetermined group of preceding vehicles based on the travel information received.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
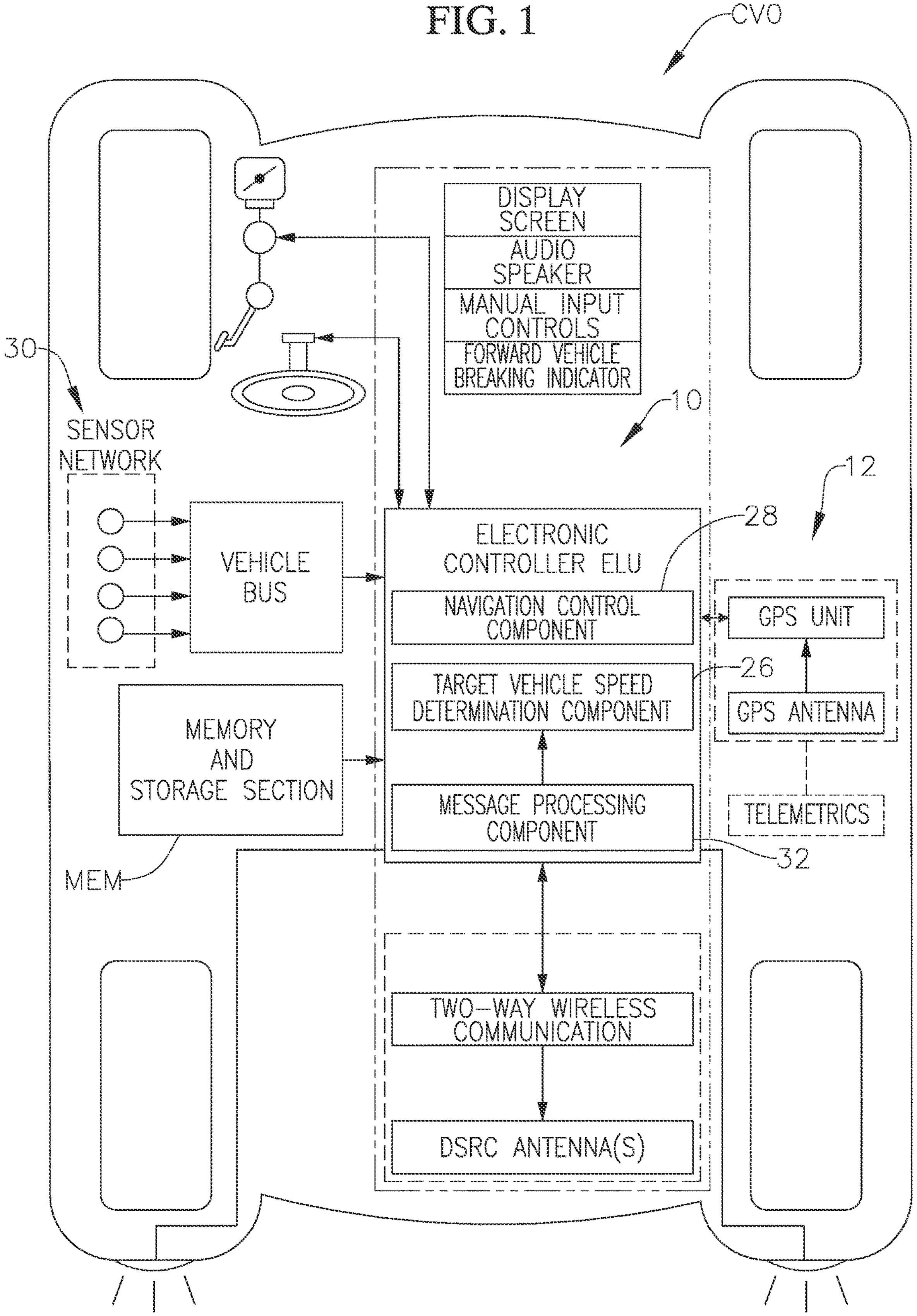
FIG. 1 is a schematic representation of a host vehicle that is equipped with an on-board unit in accordance with an illustrated embodiment.

Referring initially to FIG. 1, a vehicle CV0 is illustrated as being equipped with a vehicle on-board unit 10. The vehicle on-board unit 10 comprises a communication system 12 and an electronic controller ECU. The vehicle CV0 is considered a "host vehicle" in the illustrated embodiment. In the illustrated embodiment, the vehicle CV0 will hereafter be referred to as the "host vehicle CV0."

Figure 2:
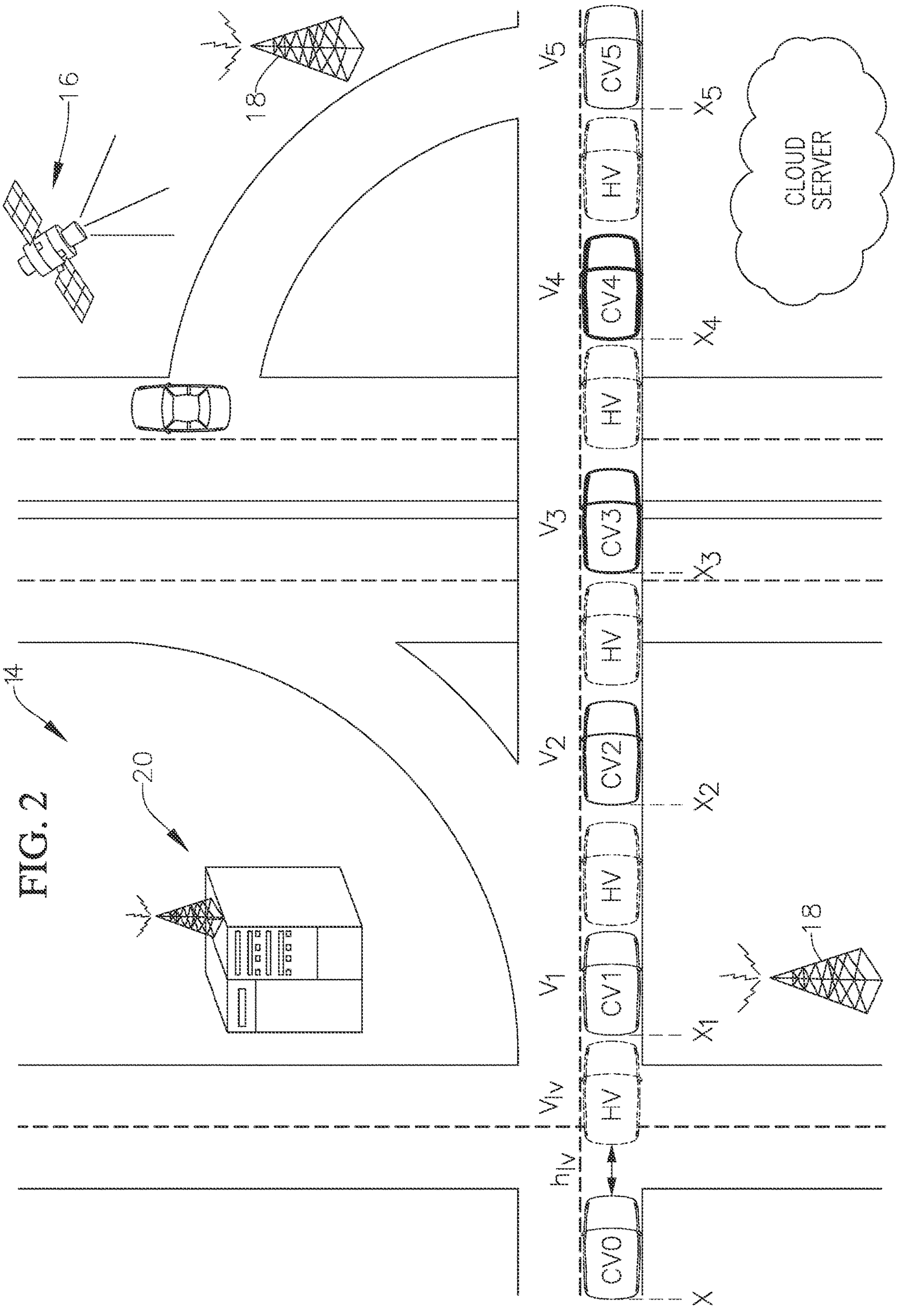
FIG. 2 is a pictorial representation of a two-way wireless communications network showing several vehicles equipped with wireless communication systems that are capable of communicate with each other.

In this system, the term "host vehicle" refers to a vehicle among a group of vehicles equipped with a two-way wireless communication system 12 in which vehicle-to-vehicle communications are carried out in accordance with the present invention, for example as schematically illustrated in FIG. 2. Therefore, the host vehicle CV0 is equipped with the on-board unit 10 having the communication system 12. In other words, the host vehicle CV0 comprises the components of the vehicle on-board unit 10.

In this system, the term "preceding vehicle CV" refers to vehicles equipped with two-way wireless communication systems 12 that are located in front of the host vehicle CV0 and traveling on the same road as the host vehicle CV0. Preceding vehicles CV are capable of either broadcasting a signal to another vehicle within a certain range and/or receiving a signal from another vehicle within a certain range. The term "neighboring vehicle. H" refers to vehicles not equipped with a two-way wireless communication systems 12 that are located within a prescribed communication (broadcasting/receiving) area. For simplicity, neighboring vehicles HV are illustrated as also being on the same road as the host vehicle CV0.

The communication system 12 of the host vehicle CV0 is a two-way wireless communication system 12 that is capable of broadcasting and receiving signals to and from preceding vehicles CV. Therefore, the communication system 12 is programmed to electronically receive travel information from one or more preceding vehicles CV that are traveling ahead of the host vehicle CV0 in the lane.

Referring to FIG. 2, a two-way wireless communications network 14 is illustrated that forms a part of a vehicle infrastructure system. In this vehicle infrastructure system, the host vehicle CV0 is equipped with the on-board unit 10 in accordance with one embodiment of the present invention.

The two-way wireless communications network 14 also preferably includes one or more global positioning satellites 16 (only one shown), and one or more roadside units 18 and a base station or external server 20 (such as a cloud server). As explained below, the vehicle on-board unit 10 is configured and arranged to execute vehicle path determination and target speed determination. In particular, the vehicle on-board unit 10 can determine a target speed for the host vehicle CV0 based on the traveling speed of the preceding vehicles CV. The vehicle on-board unit 10 will disregard the traveling speed of neighboring vehicle HVs which are not connected to the two-way wireless communications network 14.

That is, the electronic controller ECU of the vehicle on-board unit 10 includes a vehicle path determination component that is part of a navigational control component 28. The navigational control component 28 is programmed to determine a travel path of the host vehicle CV0 in the lane in which the host vehicle CV0 is currently traveling. The electronic controller ECU further includes a target vehicle speed determination component 26 programmed to determine the target vehicle speed for the host vehicle CV0 based on the travel information received from the one or more preceding vehicles CV. These functions will be further described below.

Traffic congestion is a severe problem in road networks across the world. Congestion mitigation strategies can greatly assist in improving the sustainability of existing transportation systems. Cooperative adaptive cruise control can be used to mitigate unstable driving behaviors which trigger traffic congestion by coordinating driving behaviors of automated vehicles in a platoon. However, many communications network 14*s* assumes that all vehicles are equipped with wireless communication. For example, vehicle-to-everything (V2X) assumption in cooperative adaptive cruise control assumes all vehicles on the road are equipped with wireless communication. For congestion mitigation to be effective, these systems require high penetration rates to show a significant impact.

The current vehicle on-board unit 10 is provided to operate in systems in which only a fraction of all vehicles are required to be connected to the wireless communications network 14 in order to mitigate phantom traffic and traffic congestion. The system is designed for low penetration rates of V2X communication, which can incentivize users to adopt the technology in the early phase of the development.

Therefore, the target vehicle speed determination component 26 of the illustrated embodiment programmed to determine the a target vehicle speed for the host vehicle CV0 based on the travel information received from the one or more preceding vehicles CV. The travel information includes the traveling speed of a predetermined group of preceding vehicles CV, as will be described below. In particular, the target vehicle speed determination component 26 is programmed to calculate an average speed of the predetermined group of preceding vehicles CV. The target vehicle speed determination component 26 is further programmed to set the target vehicle speed for the host vehicle CV0 based on the average speed. The operations of the target vehicle speed determination component 26 will be further discussed below.

Referring to FIG. 1, the host vehicle CV0 can be equipped with an on-board sensor network 30 comprising of a plurality of sensors. For example, the host vehicle CV0 can include one or more unidirectional or omnidirectional external cameras that take moving or still images of the host vehicle's CV0 surroundings. In addition, the external cameras can be capable of detecting the speed, direction, yaw, acceleration and distance of the host vehicle CV0 relative to a remote object. The sensor network 30 can also include infrared detectors, ultrasonic detectors, radar detectors, photoelectric detectors, magnetic detectors, acceleration detectors, acoustic/sonic detectors, gyroscopes, lasers or any combination thereof. The sensor network 30 can also include object-locating sensing devices including range detectors, such as FM-CW (Frequency Modulated Continuous Wave) radars, pulse and FSK (Frequency Shift Keying) radars, sonar and Lidar (Light Detection and ranging) devices. The data from the sensor network 30 can be used to determine information about the host vehicle's CV0 10 vicinity and the travel information of the preceding vehicles CV.

Preferably, the host vehicle CV0 preferably further includes vehicle speed sensor and a torque sensor. The vehicle speed sensor is capable of measuring the host vehicle's CV0 10 transmission output or can measure wheel speed in a conventional manner. Therefore, the vehicle speed sensor is configured to detect a current speed of the host vehicle CV0. The torque sensor can be a torque transducer that is capable of measuring and monitoring the torque on a rotating system, such as the engine's crankshaft. The torque sensor can convert a torsional mechanical input into an electrical output signal. Therefore, the torque sensor is configured to detect a current torque output of the host vehicle CV0.

Still referring now to FIG. 1, the host vehicle CV0 is basically a conventional vehicle which has been modified to incorporate the vehicle on-board unit 10 of the present invention. Thus, the conventional parts of the vehicle will not be discussed and/or illustrated herein. Rather, only those parts that interact with the vehicle on-board unit 10 will be discussed and/or illustrated herein as needed to understand the present invention.

The host vehicle CV0 is preferably provided with a steering structure, a steering vibrating device, an accelerator pedal operatively connected to a throttle valve, a throttle valve opening sensor, as well as other parts not shown. The throttle valve opening sensor is operatively connected to the electronic controller ECU to indicate the movement of the accelerator pedal and or the opening/closing of the throttle valve. Moreover, the electronic controller ECU of the vehicle on-board unit 10 is configured to receive detection signals from various in-vehicle sensors including, but not limited to, an ignition switch sensor, an accessory switch sensor, a vehicle speed sensor, an acceleration sensor, etc.

The two-way wireless communication system 12 is configured and arranged such that the electronic controller ECU receives and/or sends various signals to other DSRC equipped component and systems in the communication (broadcasting/receiving) area that surrounds the host vehicle CV0. In the illustrated embodiment, the communication system 12 of the host vehicle CV0 further includes an on-board satellite navigation device and a telematics electronic controller ECU. The telematics electronic controller ECU allows the host vehicle CV0 to be in wireless communications with a cloud services and/or a vehicle network to upload and receive crowdsourced information regarding conditions near the host vehicle's CV0 vicinity. The navigation device is in communication with a global positioning system unit (GPS) to acquire real-time information regarding conditions near the vehicle's 10 vicinity. The on-board satellite navigation device can be a global navigation satellite system (GNSS) receiver or GPS receiver that is capable of receiving information from GNSS satellites then calculate the device's geographical position. Therefore, the on-board satellite navigation device acquires GPS information for the host vehicle CV0.

As explained in more detail below, the vehicle on-board unit 10 is configured and arranged to communicate with other vehicle and the roadside units 18 to send and receive vehicle parameters relating to safety issues including but not limited to, a path history, vehicle speed, etc.

The electronic controller ECU can include a message set processing component 32 configured to process the signals from the various vehicle sensors to produce an outgoing common message set, and to process the incoming common message sets from other vehicles and/or roadside units 18. In particular, the two-way wireless communication system 12 is operatively connected to the message set processing component 32 to provide the incoming messages from preceding vehicles CV to the common message set processing component 32 of the electronic controller ECU.

Referring to FIG. 2, in the illustrated system, the vehicle on-board unit 10 acquires the following information via the two-way communication system 12:

$X_i$—the positions of the preceding vehicles CV (i.e., the vehicles connected to the two-way wireless communications network 14, and $V_i$—the traveling speeds of the preceding vehicles CV.

In this disclosure, X refers to position, V refers to traveling speed and i refers to the identity of the preceding vehicle CV. As seen in FIG. 2, the closest preceding vehicle CV to the host vehicle CV0 has an identity of i=1. In FIG. 2, CV0 refers to the host vehicle CV0. The preceding vehicles CV1, CV2, CV3, CV4, and CV5 are connected vehicles downstream in the communication range of the host vehicle CV0, with CV1 being closest to the host vehicle CV0, CV2 is the second closest, and so on.

The position of the host vehicle CV0 is depicted as X, the position of the preceding vehicle CV1 as $X_1$, the position of the preceding vehicle CV CV2 as $X_2$, and so on. The speed of the preceding vehicle CV1 is depicted as $V_1$, the speed of the preceding vehicle CV2 is depicted as $V_2$, and so on. The neighboring vehicles HV are vehicles that are also traveling in the same lane as the host vehicle CV0 but are not connected to the communications network 14.

The vehicle on-board unit 10 also acquires the following information via the on-board sensor network 30, such as via radar, lidar or cameras:

$H_{LV}$—headway of the leading vehicle LV (i.e., the vehicle traveling directly ahead of the host vehicle CV0 in the lane), and $V_{LV}$—the traveling speed of the leading vehicle LV.

The message set processing component 32 can be programmed to process this data that is collected and to remove duplicates in case the leading vehicle LV is connected to the two-way wireless network.

As seen in FIG. 2, the two-way wireless communications are conducted between the host vehicle CV0 as well as between the preceding vehicles CV and the roadside units 18. The external server 20 is configured and arranged to communicate with the vehicle on-board unit 10 to provide the off-board navigation service through wireless communications via the roadside units 18 within the two-way wireless communications network 14, if need and/or desired. In particular, the roadside units 18 relays signals between the vehicle on-board unit 10 of the host vehicle CV0 and the external server 20. Thus, the roadside units 18 are configured to send signals to the external server 20 and host vehicle CV0 and the preceding vehicles CV, and also to receive signals from the host vehicle CV0, the preceding vehicles CV and the external server 20. While the two-way wireless communications network 14 is illustrated as a dedicated short range communications (DSRC) network, it will be apparent to those skilled in the vehicle field from this disclosure that other types of two-way wireless communications network 14*s* can be used to carry out the present invention.

The two-way wireless communication system 12 preferably of the on-board unit 10 includes communication interface circuitry that connects and exchanges information with other ones of the vehicles (i.e., the preceding vehicles CV) that are similarly equipped as well as with the roadside units 18 through a wireless network within the broadcast range of the host vehicle CV0. The two-way wireless communication system 12 is preferably configured and arranged to conduct direct two-way communications between vehicles (vehicle-to-vehicle communications) and roadside units 18 (roadside-to-vehicle communications). Moreover, the two-way wireless communication system 12 is preferably configured to periodically broadcast a signal with the so called common message set in the broadcast area. The so called common message set can be broadcasted in different ways, i.e., (1) event based broadcasting, (2) periodic broadcasting and (3) hybrid (event based/periodic) broadcasting. Thus, the two-way wireless communication system 12 acts as a two-way wireless communications section that is configured to receive the incoming common message sets from neighboring (preceding and following) vehicles.

More specifically, as seen in FIG. 1, the two-way wireless communication system 12 is an on-board unit 10 that includes a two-way communication device and one or more antennas. As mentioned above, the two-way wireless communication system 12 can be any suitable two-way wireless system, e.g., DSRC cellular, Wimax, Wifi, etc. The two way communication device is configured to at least conduct direct short range communications in a host vehicle CV0 broadcast area surrounding the host vehicle CV0 via the antennas. Preferably, the antennas include both an omni-directional antenna and a multi-directional antenna.

However, other two-way wireless communication system 12*s* can be used if they are capable of conducting both point-to-point wireless communications and broadcast wireless messages in a limited broadcast area so long as the latency time between communications is short enough to carry out the present invention. The two-way wireless communication system 12 can be assigned a Medium Access Control (MAC) address and/or an IP address so that each vehicle in the network can be individually identified.

The electronic controller ECU of the vehicle on-board unit 10 includes one or more processor(s). The processor(s) can include any device or combination of devices capable of manipulating or processing a signal or other information now-existing or hereafter developed, including optical processors, quantum processors, molecular processors, or a combination thereof. For example, the processor(s) can include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof.

As used herein, the terminology "processor(s)" indicates one or more processor(s), such as one or more special purpose processor(s), one or more digital signal processor(s), one or more microprocessor(s), one or more controllers, one or more microcontrollers, one or more application processor(s), one or more Application Specific Integrated Circuits, one or more Application Specific Standard Products; one or more Field Programmable Gate Arrays, any other type or combination of integrated circuits, one or more state machines, or any combination thereof.

The vehicle on-board unit 10 further includes a computer readable medium MEM that serves as a computer memory for the navigational control system. As used herein, the terminology "memory" or "computer-readable medium MEM" (also referred to as a processor-readable medium) indicates any computer-usable or computer-readable medium MEM or device that can tangibly contain, store, communicate, or transport any signal or information that may be used by or in connection with any processor(s). For example, the computer readable medium may be one or more read only memories (ROM), one or more random ac, ess memories (RAM), one or more registers, low power double data rate (LPDDR) memories, one or more cache memories, one or more semiconductor memory devices, one or more magnetic media, one or more optical media, one or more magneto-optical media, or any combination thereof.

Therefore, the computer-readable medium MEM further includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media can include, for example, optical or magnetic disks and other persistent memory. Volatile media may include, for example, dynamic random access memory (DRAM), which typically constitutes a main memory.

The computer readable medium MEM can also be provided in the form of one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The processor(s) can execute instructions transmitted by one or more transmission media, including coaxial cables, copper wire and fiber optics, including the wires that comprise a system bus coupled to a processor(s) of a computer. As used herein, the terminology "instructions" may include directions or expressions for performing any method, or any portion or portions thereof, disclosed herein, and may be realized in hardware, software, or any combination thereof.

For example, instructions may be implemented as information, such as a computer program, stored in memory that may be executed by a processor(s) to perform any of the respective methods, algorithms, aspects, or combinations thereof, as described herein. In some embodiments, instructions, or a portion thereof, may be implemented as a special purpose processor(s), or circuitry, that may include specialized hardware for carrying out any of the methods, algorithms, aspects, or combinations thereof, as described herein. In some implementations, portions of the instructions may be distributed across multiple processor(s) on a single device, on multiple devices, which may communicate directly or across a network such as a local area network, a wide area network, the Internet, or a combination thereof.

Computer-executable instructions can be compiled or interpreted from computer programs created using a variety of programming languages and/or technologies, including, without limitation, and either alone or in combination, Java™, C, C++, Visual Basic, Java Script, Perl, etc. In general, the processor(s) receives instructions from the computer-readable medium MEM and executes these instructions, thereby performing one or more processes, including one or more of the processes described herein. Such instructions and other data may be stored and transmitted using a variety of computer-readable media.

The target vehicle speed determination component 26 will now be discussed with reference to FIGS. 3 to 5. In particular, the target vehicle speed determination component 26 is programmed to generate a series of acceleration (or speed) commands for the host vehicle CV0. The speed commands will be subject to a quadratic cost function and constraints on the states, speed limits, acceleration limits, initial and target states, etc. Therefore, the vehicle on-board unit 10 is provided to help reduce phantom traffic caused by human driving errors. The vehicle on-board unit 10 is provided to the host vehicle CV0 and can be provided to other similar vehicles in tandem to help reduce traffic congestion with varying performance levels depending on scenarios like connection penetration rate, communication range, etc. In particular, the vehicle on-board unit 10 controls the host vehicle CV0 to account for the minimum speed of the preceding vehicles CV, variations (standard-deviations) of the speeds of the preceding vehicles CV, average speed of the preceding vehicles CV, and travel time.

The framework utilizes the host vehicle's CV0 radar and the communicated information from downstream vehicles up to the slowest vehicle in the platoon. Using the above information, a weighted average of speeds based on the relative positions of the preceding vehicles CV is used as the target set speed for the system to perform efficiently in a mixed autonomy fashion. The calculated target vehicle speed and the position leading vehicle ahead of the host vehicle CV0 are used by the electronic controller ECU to control the host vehicle CV0.

Figure 3:
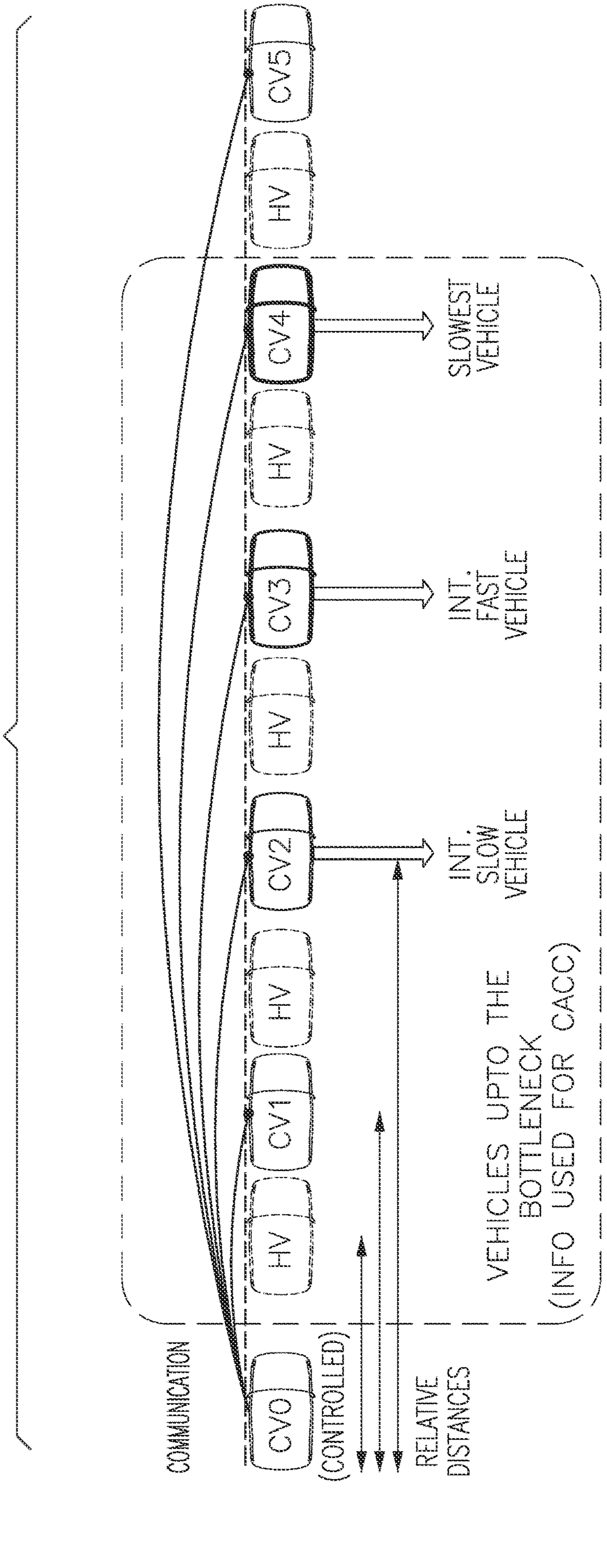
FIG. 3 is a pictorial representation of the host vehicle traveling in a lane with a plurality of preceding vehicles in connection with the wireless communications network to show a first method of calculating target vehicle speed for the host vehicle.

Referring now to FIG. 3, a first method implemented by the target vehicle speed determination component 26 will now be discussed. In the first method, the target vehicle speed determination component 26 determines the slowest connected preceding vehicle CV (hereinafter "the slowest traveling vehicle"). In the first method, the target vehicle speed determination component 26 utilizes only data of the preceding vehicles CV behind the slowest traveling vehicle. As previously discussed, the target vehicle speed is determined based on traveling speed of a predetermined group of preceding vehicles CV.

In the first method, the predetermined group of preceding vehicles CV includes the slowest traveling vehicle within a predetermined distance preceding the host vehicle CV0. Preferably, the predetermined distance preceding the host vehicle CV0 is approximately 300 meters from the host vehicle CV0, which corresponds to the approximate range of the wireless communications system 12 of the vehicle on-board unit 10, such as the DSRC. That is, the target vehicle speed determination component 26 assesses the vehicle speeds of the preceding vehicles CV within a 300 meter radius with respect to the host vehicle CV0 to determine the slowest traveling vehicle within that radius.

As the first method accounts for the traveling speeds of only the preceding vehicles CV up to the slowest traveling vehicle, the predetermined group of preceding vehicles CV includes the slowest traveling vehicle and one or more intermediate preceding vehicles CV traveling between the host vehicle CV0 and the slowest traveling vehicle. As seen in FIG. 3, the preceding vehicle CV4 is considered the slowest traveling vehicle for illustrative purposes. The target vehicle speed determination component 26 calculates the target speed for the host vehicle CV0 based on the preceding vehicles CV1, CV2, CV3 and up to CV4. The target vehicle speed determination component 26 does not account for the speeds of the neighboring vehicles HV even though these vehicles are traveling between the host vehicle CV0 and CV4 because these neighboring vehicles HV are not connected to the communications network 14.

Therefore, the first method, the vehicle on-board unit 10 determines the slowest traveling vehicle among N connected preceding vehicles CV with respect to the host vehicle CV0. The target vehicle speed determination component 26 considers only the slowest traveling vehicle and the other preceding vehicles CV in the target vehicle speed calculation for the host vehicle CV0. In this example, target vehicle speed determination component 26 calculates the target speed for the host vehicle CV0 based on the preceding vehicles CV1, CV2, CV3 . . . . n where n represents the preceding vehicles CV being accounted for by the first method. The number of vehicles n can be depicted by the following formula:

$$n = \mathrm{argmin}_{i \in 1:N} x_i : v_{i+1} > v_i$$

In this case, the target vehicle speed $V_{target}$ is illustrated by the following formula:

$$p_{target} = \frac{1}{\left(\frac{1}{x_1.x} + \frac{1}{x_2..x} + \frac{1}{x_3.x} + \frac{1}{x_4.x}\right)} \cdot \left(\frac{1}{x_1 - x} v_1 + \frac{1}{x_2 - x} v_2 + \frac{1}{x_3 - x} v_3 + \frac{1}{x_4 - x} v_4\right).$$

Preferably, with the first method, the target vehicle speed determination component 26 executes a calculation for a hyperbolic distribution of weights for set speed of the preceding vehicles CV to determine the target vehicle speed as follows:

$$v_{target} = K \sum_{i=1}^{n} \frac{1}{(x_i - x)} \cdot v_i$$

where $x_i$ is the position of the relevant preceding vehicle $CV_i$ x is the position of the host vehicle CV0, $v_i$ is the traveling speeds of the relevant preceding vehicles CV, and $$K = \sum_{i=1}^{n} \frac{1}{(x_i - x)}, \text{ for normalization}$$

Figure 4:
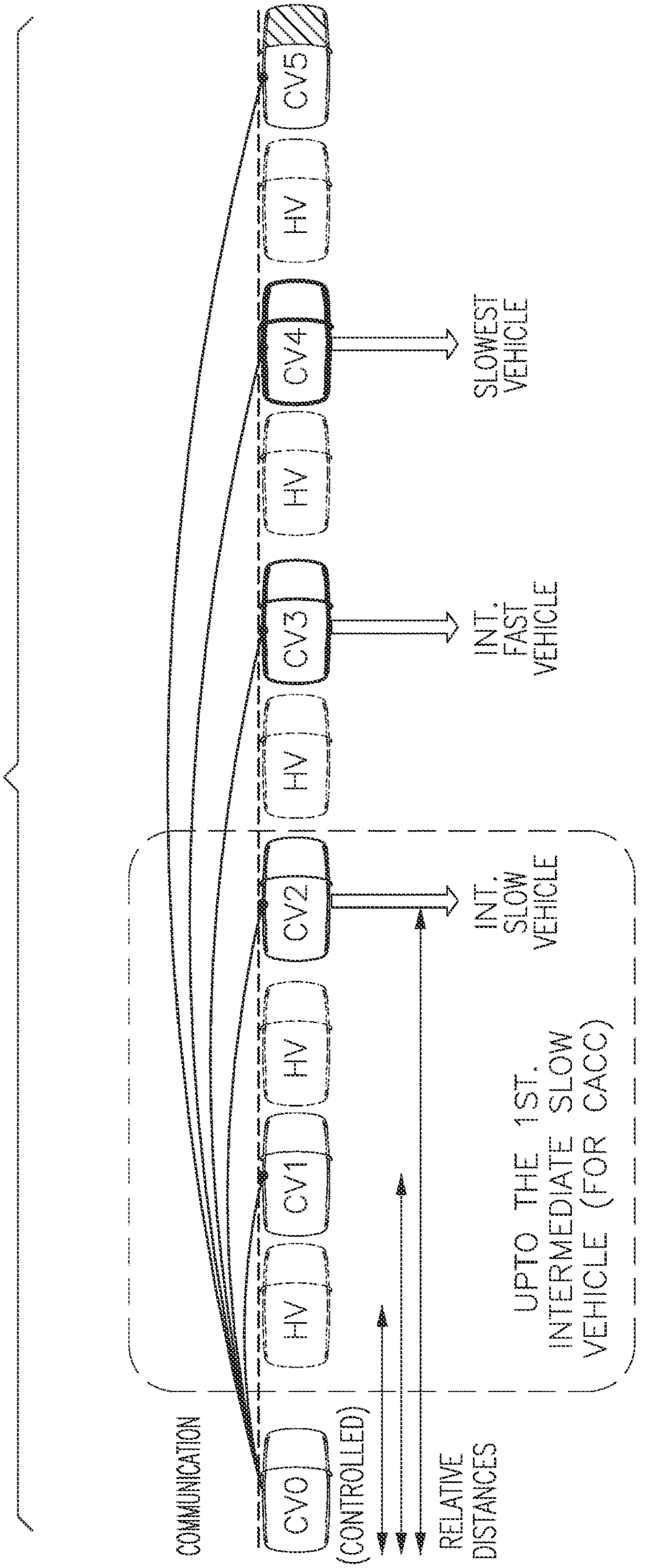
FIG. 4 is another pictorial representation of the host vehicle traveling in a lane with a plurality of preceding vehicles in connection with the wireless communications network to show a second method of calculating target vehicle speed for the host vehicle.

Referring now to FIG. 4, a second method implemented by the target vehicle speed determination component 26 will now be discussed. In the second method, the target vehicle speed determination component 26 determines a first intermediate slowest vehicle. In the illustrated embodiment, the "first intermediate slowest vehicle" refers to a first preceding vehicle CV that is traveling at a speed slower than the host vehicle CV0. That is, the target vehicle speed is also determined based on traveling speed of a predetermined group of preceding vehicles CV in the second method. In the second method, the predetermined group of preceding vehicles CV includes the first intermediate slowest vehicle and one or more intermediate preceding vehicles CV traveling between the host vehicle CV0 and the first intermediate slowest vehicle. The target vehicle speed determination component 26 utilizes only data of the preceding vehicles CV behind the first intermediate slowest vehicle.

As the second method accounts for the traveling speeds of only the preceding vehicles CV up to the first intermediate slowest vehicle, the predetermined group of preceding vehicles CV includes the first intermediate slowest vehicle and one or more intermediate preceding vehicles CV traveling between the host vehicle CV0 and the first intermediate slowest vehicle. As seen in FIG. 4, the preceding vehicle CV2 is considered the slowest intermediate vehicle for illustrative purposes. The target vehicle speed determination component 26 calculates the target speed for the host vehicle CV0 based on the preceding vehicles CV1 and CV2 only. In this example, target vehicle speed determination component 26 calculates the target speed for the host vehicle CV0 based on the preceding vehicles CV1, CV2 . . . n where n represents the preceding vehicles CV being accounted for by the first method and can be depicted by the following formula:

$$n = \mathrm{argmin}_{i \in 1:N} x_i : v_{i+1} > v_i$$

To find the first intermediate slowest vehicle, the target vehicle speed determination component 26 is programmed to compare the traveling speeds of two consecutive preceding vehicles CV. For example, the target vehicle speed determination component 26 first compares the speed of CV1 and CV2, which are both preceding the host vehicle CV0. If the preceding vehicle CV2 is slower than the CV1, then the target vehicle speed determination component 26 determines that the preceding vehicle CV1 is not the first intermediate slowest vehicle. Then the target vehicle speed determination component 26 compares the traveling speeds of preceding vehicles CV2 and CV3. In this example, the target vehicle speed determination component 26 determines that the preceding vehicle CV3 is traveling at a faster speed than the preceding vehicle CV2. Therefore, the target vehicle speed determination component 26 determines that the preceding vehicle CV2 is the first intermediate slowest vehicle.

Preferably, with the second method, the target vehicle speed determination component 26 executes a calculation for a linear distribution of weights for set speed of the preceding vehicles CV to determine the target vehicle speed as follows:

$$v_{target} = P\sum_{i=1}^{n}(Q-(x_i-x))\cdot v_i$$

where $x_i$ is the position of the relevant preceding vehicle $CV_i$ x is the position of the host vehicle CV0, $v_i$ is the traveling speeds of the relevant preceding vehicles CV, Q is a parameter, and $$P=\sum_{i=1}^{n}(Q-(x_i-x)),\text{ for normalization}$$

Figure 5:
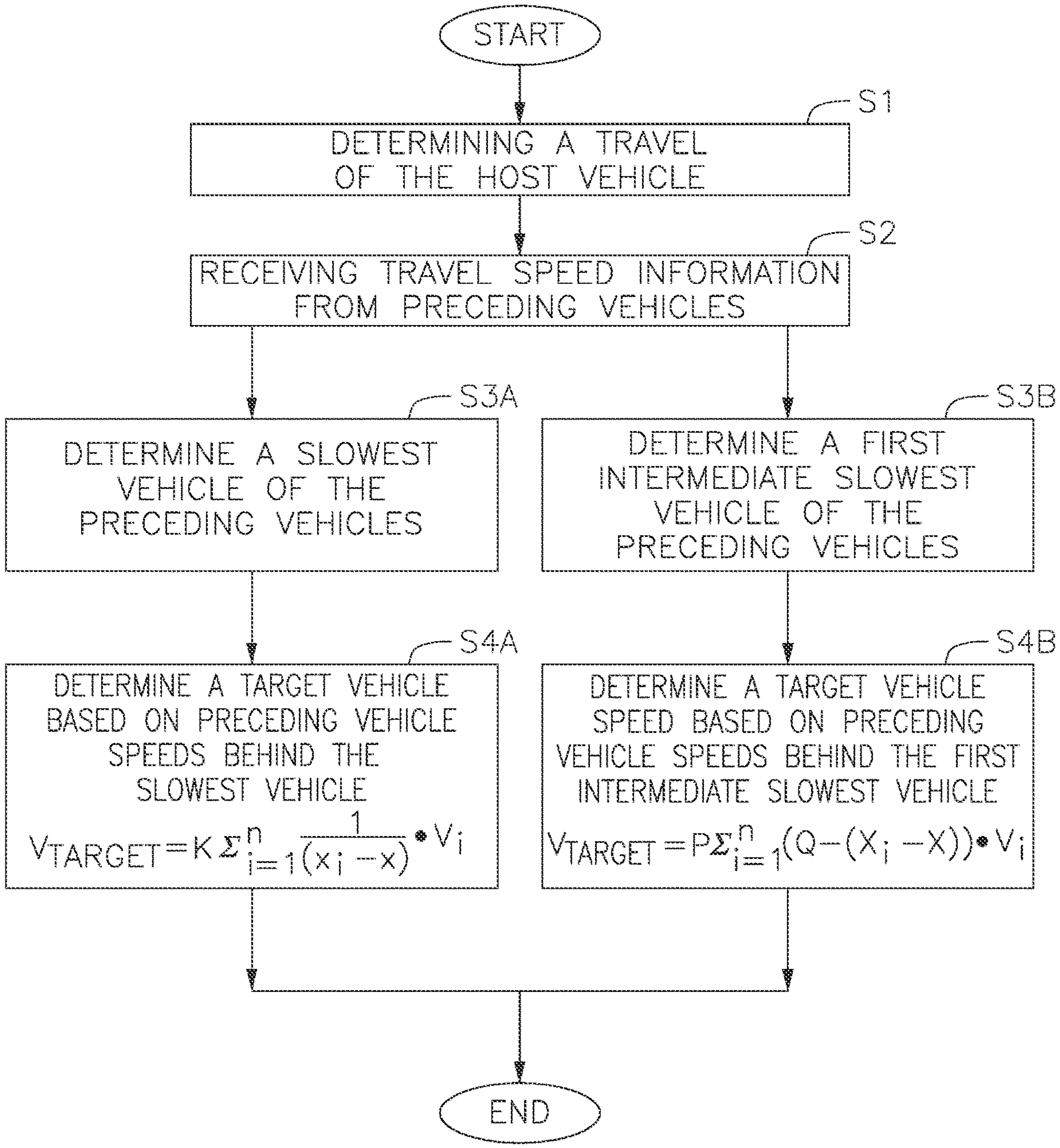
FIG. 5 is a flowchart of the steps for determining a target vehicle speed based on the first and second methods described in FIGS. 3 and 4.

Referring now to FIG. 5, a target vehicle speed determination method will now be discussed. The target vehicle speed determination method can be executed by the components and processor(s) of the vehicle on-board unit 10.

The target vehicle speed determination method comprises determining a travel path of the host vehicle CYO in step S1. The travel path is a lane in which the host vehicle CV0 is currently traveling. The target vehicle speed determination method further comprises receiving travel information from one or more preceding vehicles CV that are traveling ahead of the host vehicle CV0, in step S2. In particular, the vehicle on-board unit 10 can acquire this information from the two-way communication system 12 and/or the on-board sensor network 30 (e.g., the radar, etc.).

Using this information acquired in step S2, the vehicle on-board unit 10 can determine a slowest vehicle of preceding vehicles CV in step 3A. Alternatively, the vehicle on-board unit 10 can determine a first slowest vehicle in step 3B.

The target vehicle speed determination method further comprises calculating an average speed of a predetermined group of preceding vehicles CV based on the travel information received. In the first method discussed above, the predetermined group of preceding vehicles CV includes a slowest traveling vehicle within a predetermined distance preceding the host vehicle CV0. In the illustrated embodiment, the predetermined distance is approximately 300 meters. It will be apparent to those skilled in the vehicle field from tis disclosure that the predetermined distance can vary as needed and/or desired. Therefore, in the first method, the target vehicle speed determination method further comprises calculating a target vehicle speed based on the slowest vehicle in the range and the preceding vehicles CV that are traveling between the host vehicle CV0 and the slowest vehicle, in step S4A.

In the second method, the predetermined group of preceding vehicles CV includes the first intermediate slowest vehicle and one or more intermediate preceding vehicles CV traveling between the host vehicle CV0 and the first intermediate slowest vehicle. Therefore, in the second method, the target vehicle speed determination method further comprises calculating a target vehicle speed based on the first intermediate slowest vehicle and the preceding vehicles CV that are traveling between the host vehicle CV0 and the first intermediate slowest vehicle, in step S4B. Therefore, the target vehicle speed determination method comprises calculating an average speed of a predetermined group of preceding vehicles CV based on the travel information received.

With the disclosed system, the target vehicle speed determination method accounts for lane changes of vehicles and different communication penetration rates based on the communication distance between the host vehicle CV0 and the relevant preceding vehicle CV(s). Since not all data from these connected vehicles are not necessarily relevant to the host vehicle CV0, the target vehicle speed determination method keep uses data from n preceding vehicles CV.

Figure 6:
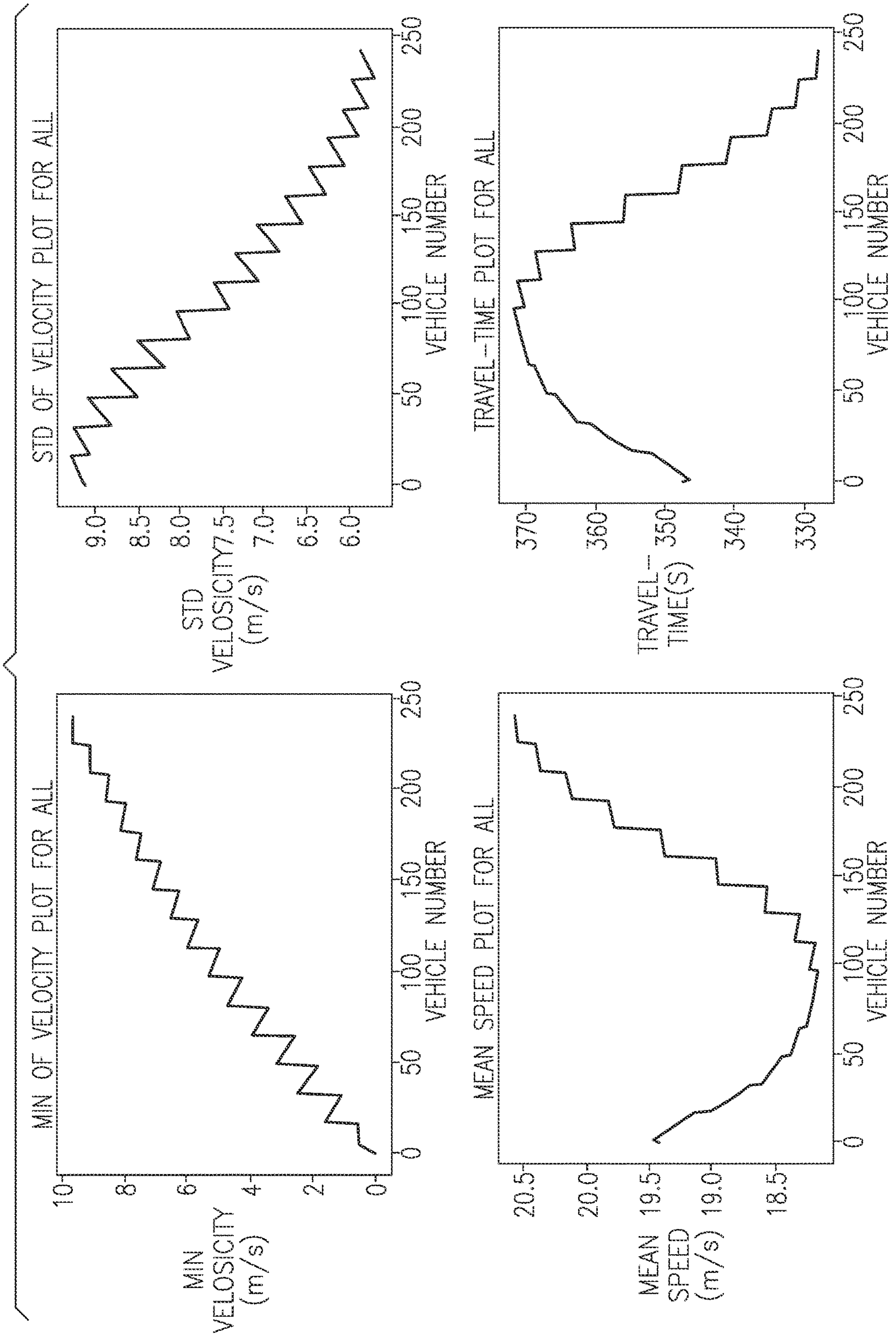
FIG. 6 are graphical representations of technical improvements that can be achieved by the target vehicle speed calculations of the illustrated embodiment.

With the disclosed system, the target vehicle speed determination method achieves the technical improvement of calculating a target vehicle speed for the host vehicle CV0 that achieves the reduction of traffic congestion as graphically illustrated in FIG. 6.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including" "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle on-board unit. Accordingly, these terms, as utilized to describe the present invention should be interpreted relative to a vehicle equipped with the vehicle on-board unit.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle on-board unit for a host vehicle comprising:
a communication system including an antenna that is configured to be mounted to the host vehicle and programmed to electronically receive travel information from one or more preceding vehicles that are traveling ahead of the host vehicle in a lane; and
an electronic controller including
a vehicle path determination component programmed to determine a travel path of the host vehicle in the lane in which the host vehicle is currently traveling,
a target vehicle speed determination component programmed to select a reference vehicle from the travel path that is traveling ahead of the host vehicle and to determine a target vehicle speed for the host vehicle based on a hyperbolic distribution that uses as inputs a distance from the host vehicle and a traveling speed of a predetermined group of preceding vehicles traveling between the host vehicle and the reference vehicle up to the reference vehicle, and control the target vehicle speed for the host vehicle.

2. The vehicle on-board unit according to claim 1, wherein
the target vehicle speed determination component is programmed to calculate an average speed of the predetermined group of preceding vehicles, the target vehicle speed determination component being further programmed to control the target vehicle speed for the host vehicle based on the average speed.

3. The vehicle on-board unit according to claim 1, wherein
the predetermined distance preceding the host vehicle is approximately 300 meters.

4. The vehicle on-board unit according to claim 1, wherein
the reference vehicle is a first intermediate slowest vehicle, the first intermediate slowest vehicle being a first preceding vehicle that is traveling at a speed slower than the host vehicle.

5. The vehicle on-board unit according to claim 4, wherein
the target vehicle speed is based on the first intermediate slowest vehicle and the traveling speed of each of the preceding vehicles traveling between the host vehicle and the first intermediate slowest vehicle.

6. The vehicle on-board unit according to claim 1, the reference vehicle selected by the target vehicle speed determination component is the slowest vehicle within a predetermined distance ahead of the host vehicle and determines the target vehicle speed for the host vehicle based on the hyperbolic distribution of distance from the host vehicle and the traveling speed of only the predetermined group of preceding vehicles traveling between the host vehicle and the reference vehicle up to the reference vehicle.

7. A host vehicle comprising:
a communication system including an antenna that is configured to be mounted to the host vehicle and programmed to electronically receive travel information from one or more preceding vehicles; and
an electronic controller including
a vehicle path determination component programmed to determine a travel path of the host vehicle in a lane in which the host vehicle is currently traveling,
a target vehicle speed determination component programmed to select a reference vehicle from the travel path that is traveling ahead of the host vehicle and to determine a target vehicle speed for the host vehicle based on a hyperbolic distribution that uses as inputs a distance from the host vehicle and a traveling speed of a predetermined group of preceding vehicles traveling between the host vehicle and the reference vehicle up to the reference vehicle, and control the target vehicle speed for the host vehicle.

8. The host vehicle according to claim 7, wherein
the target vehicle speed determination component is programmed to calculate an average speed of the predetermined group of preceding vehicles, the target vehicle speed determination component being further programmed to control the target vehicle speed for the host vehicle based on the average speed.

9. The host vehicle according to claim 8, wherein
the predetermined distance preceding the host vehicle is approximately 300 meters.

10. The host vehicle according to claim 7, wherein
the reference vehicle is a first intermediate slowest vehicle, the first intermediate slowest vehicle being a first preceding vehicle that is traveling at a speed slower than the vehicle.

11. The host vehicle according to claim 10, wherein
the target vehicle speed is based on the first intermediate slowest vehicle and the traveling speed of one or more intermediate preceding vehicles traveling between the host vehicle and the first intermediate slowest vehicle.

12. The host vehicle according to claim 7, wherein the reference vehicle selected by the target vehicle speed determination component is the slowest vehicle within a predetermined distance ahead of the host vehicle and determines the target vehicle speed for the host vehicle based on the hyperbolic distribution of distance from the host vehicle and the traveling speed of only the predetermined group of preceding vehicles traveling between the host vehicle and the reference vehicle up to the reference vehicle.

13. A target vehicle speed determination method executed by an on-board vehicle electronic controller comprising:
determining a travel path of a host vehicle in a lane in which the host vehicle is currently traveling;
receiving travel information from one or more preceding vehicles that are traveling ahead of the host vehicle in the lane;
selecting a reference vehicle from the travel path that is traveling ahead of the host vehicle;
calculating a hyperbolic distribution that uses as inputs a distance from the host vehicle and a traveling speed of the preceding vehicles traveling between the host vehicle and the reference vehicle up to the reference vehicle;
determining a target speed for the host vehicle based on the hyperbolic distribution of distance for a set speed that is calculated; and
controlling the target vehicle speed for the host vehicle based on the hyperbolic distribution of distance for the set speed.

14. The target vehicle speed determination method according to claim 13, wherein
the predetermined distance preceding the host vehicle is approximately 300 meters.

15. The target vehicle speed determination method according to claim 13, wherein the reference vehicle is a first intermediate slowest vehicle, the first intermediate slowest vehicle being a first preceding vehicle that is traveling at a speed slower than the vehicle.

16. The target vehicle speed determination method according to claim 15, wherein the target vehicle speed is based on the first intermediate slowest vehicle and the traveling speed of each of the preceding vehicles traveling between the host vehicle and the first intermediate slowest vehicle.

17. The target vehicle speed determination method according to claim 13, wherein the reference vehicle is the slowest vehicle within a predetermined distance ahead of the host vehicle and the calculating the target vehicle speed for the host vehicle based on the hyperbolic distribution of distance from the host vehicle and the traveling speed of only the group of preceding vehicles traveling between the host vehicle and the reference vehicle up to the reference vehicle.

* * * * *